US012617139B2

(12) United States Patent
    Asanuma

(10) Patent No.: US 12,617,139 B2
(45) Date of Patent: May 5, 2026

(54) CONTROL METHOD FOR INJECTION MOLDING MACHINE AND INJECTION MOLDING MACHINE

(71) Applicant: Shibaura Machine Co., Ltd., Chiyoda-ku (JP)

(72) Inventor: Nobuyuki Asanuma, Numazu (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 31 days.

(21) Appl. No.: 18/550,436

(22) PCT Filed: Feb. 24, 2022

(86) PCT No.: PCT/JP2022/007609
    § 371 (c)(1),
    (2) Date: Sep. 13, 2023

(87) PCT Pub. No.: WO2022/196280
    PCT Pub. Date: Sep. 22, 2022

(65) Prior Publication Data
    US 2024/0157618 A1 May 16, 2024

(30) Foreign Application Priority Data
    Mar. 16, 2021 (JP) ................................ 2021-042725

(51) Int. Cl.
    B29C 45/77 (2006.01)

(52) U.S. Cl.
    CPC .... B29C 45/77 (2013.01); *B29C 2945/76006* (2013.01); *B29C 2945/76187* (2013.01);
    (Continued)

(58) Field of Classification Search
    CPC .......... B29C 45/77; B29C 2945/76006; B29C 2945/76605
    See application file for complete search history.

(56) References Cited

U.S. PATENT DOCUMENTS

2006/0131772 A1    6/2006   Yamada
2008/0305200 A1    12/2008  Maruyama et al.

FOREIGN PATENT DOCUMENTS

CN         103158236 A     6/2013
CN         112454841 A     3/2021
                        (Continued)

OTHER PUBLICATIONS

German Office Action issued Oct. 22, 2024, in corresponding German Patent Application No. 11 2022 001 523.3 (with English Translation), 8 pages.

(Continued)

*Primary Examiner* — James Sanders
(74) *Attorney, Agent, or Firm* — Oblon, McClelland, Maier & Neustadt, L.L.P.

(57) ABSTRACT

A control method for an injection molding machine includes a measurement process of feeding a quantity of molten resin along a length of a heating barrel by moving a screw backward while rotating the screw in the heating barrel for melting a resin material, during the measurement process before the measurement process is completed, reducing a rotational speed of the screw at a same time as reducing a backward movement speed of the screw, stopping backward movement of the screw when the measurement process is completed, and the rotational speed and a rotation direction of the screw are controlled such that a back pressure becomes a target pressure at a target time lower than the back pressure that is measured at a time when the measurement process is completed, and injecting the molten resin into a mold after reaching the target time.

6 Claims, 11 Drawing Sheets

(52) U.S. Cl.
CPC ............... *B29C 2945/76381* (2013.01); *B29C 2945/76605* (2013.01); *B29C 2945/76665* (2013.01); *B29C 2945/76859* (2013.01)

(56)                References Cited

FOREIGN PATENT DOCUMENTS

| | | |
|---|---|---|
| DE | 10 2020 005 374 A1 | 3/2021 |
| DE | 10 2020 125 211 A1 | 4/2021 |
| JP | 6-23813 A | 2/1994 |
| JP | 2004-154988 A | 6/2004 |
| JP | 2004-155162 A | 6/2004 |
| JP | 2006-168325 A | 6/2006 |
| JP | 2007-015349 A | 1/2007 |
| JP | 2007-253606 A | 10/2007 |
| JP | 2008-143022 A | 6/2008 |
| JP | 2008-302649 A | 12/2008 |
| JP | 2010-247411 A | 11/2010 |

OTHER PUBLICATIONS

Japanese Office Action issued Jun. 18, 2024 in corresponding Japansse Patent Application No. 2021-042725 (with English translation), 3 pages.
International Search Report mailed on Mar. 29, 2022 in PCT/JP2022/007609 filed on Feb. 24, 2022 (2 pages).
Office Action issued in Chinese Patent Application No. 202280021403.7 on Nov. 13, 2025, (with English translation).

| INJECTION | INJECTION | | MOLD OPENING | TAKING-OUT | INTER-MEDIATE | MOLD CLOSING |
|---|---|---|---|---|---|---|
| | MEASUREMENT | PRESSURE REDUCTION (PRESSURE CONTROL) | | | | |

CONTROL METHOD FOR INJECTION MOLDING MACHINE AND INJECTION MOLDING MACHINE

CROSS-REFERENCE TO RELATED APPLICATIONS

This application is a national stage application of International Application No. PCT/JP2022/007609, filed Feb. 24, 2022, which designates the United States, incorporated herein by reference, and which claims the benefit of priority from Japanese Patent Application No. 2021-042725, filed Mar. 16, 2021, the entire contents of which are incorporated herein by reference.

TECHNICAL FIELD

The present invention relates to a control method for an injection molding machine that injects a molten resin material to perform molding, and the injection molding machine.

BACKGROUND ART

In an injection molding machine, in a measurement process of measuring resin to be injected into a mold, a screw is rotated in a heating barrel to melt and knead a resin material while the screw is moved backward to a predetermined position. In this way, molten resin to be injected into the mold at the next injection process is fed to a distal end of the heating barrel, and the molten resin is measured. In some injection molding machines in the related art, the screw is made to perform a predetermined operation after the molten resin is measured for the purpose of reducing a pressure of the molten resin after the measurement, securing quality of a molded article, and the like. That is, the pressure of the molten resin positioned at the distal end of the heating barrel after the measurement is high, so that a failure may be caused such that the measured molten resin leaks out from a nozzle positioned at the distal end of the heating barrel accordingly. In this case, a resin amount used for molding may be changed, or an appearance defect may be caused in the molded article, so that some of injection molding machines in the related art cause the screw to perform a predetermined operation after the molten resin is measured for the purpose of suppressing such a failure.

For example, in the injection molding machine disclosed in Patent Literature 1, after the molten resin is measured, the screw is moved backward to a backward movement stop point, and a backward movement speed is lowered in a predetermined period during backward movement and the screw is reversely rotated to prevent excessive reverse rotation and adjust pressure reduction with high accuracy. Due to this, a measurement condition for obtaining a more correct and uniform measured resin amount is determined in a short time. In the injection device disclosed in Patent Literature 2, degassing of a molten material is implemented with a simple configuration by rotating, immediately after plasticization of a molding material ends, the screw by a predetermined rotation angle in a direction opposite to a rotation direction of the plasticization to reduce the pressure of the molten material.

CITATION LIST

Patent Literature

Patent Document 1: Japanese Patent Application Laid-open No. 2007-253606

Patent Document 2: Japanese Patent Application Laid-open No. 2008-143022

SUMMARY OF INVENTION

Problem to be Solved by the Invention

As a method for reducing the pressure of the molten resin after measurement, as described above, exemplified are a method of moving the screw backward to a predetermined position or by a predetermined amount, what is called suck-back, and a method of reversely rotating the screw by a predetermined rotation angle. However, in a case of performing suck-back, the pressure of the molten resin positioned at the distal end side in the heating barrel after the measurement is locally and abruptly lowered, so that the molten resin positioned behind the heating barrel, that is, on a hopper side where the resin material is put into the heating barrel may pass through a check ring disposed on the screw to flow into a distal end side in the heating barrel. In this case, the measured resin amount varies, so that weight stability of the molded article may be lowered. Additionally, in a case in which the pressure of the molten resin is locally and abruptly lowered when suck-back is performed, a negative-pressure clearance like a void tends to be generated in the molten resin, and gas generated from the molten resin tends to accumulate in the clearance. In this case, the gas generated from the molten resin may lower the quality of the molded article such that a silver trace, what is called a silver streak, is generated on a surface of the molded article, or a surface of the mold is contaminated by the gas, for example.

In a case of reversely rotating the screw by a predetermined rotation angle for a short time after measuring the molten resin, the entire pressure inside the heating barrel is abruptly reduced to the vicinity of atmospheric pressure, so that gas is not locally generated from the molten resin but tends to be generated from the entire molten resin, and the gas that cannot be discharged to the hopper side tends to stay inside the heating barrel. In a case of reversely rotating the screw by a predetermined rotation angle for a short time after measuring the molten resin, gas is continuously generated from the molten resin during a waiting time from when the measurement process in the heating barrel is completed until a cooling time as a time required for solidification of the resin filled in the mold is completed, so that the gas that cannot be discharged to the hopper side tends to be increased with a lapse of time. In a case of reversely rotating the screw by a predetermined rotation angle for a short time after measuring the molten resin, it is difficult to adjust a reverse rotation amount and a reverse rotation time. In a case in which an inordinate setting is made, the molten resin tends to entrain air because the pressure of the molten resin is excessively lowered, a molding fault such as a silver streak tends to be caused, and the quality of the molded article tends to be lowered.

As described above, in a case of performing suck-back or reversely rotating the screw by a predetermined rotation angle for a short time to reduce the pressure of the molten resin after the measurement, there is concern about various failures to be caused, and it has been very difficult to appropriately reduce the pressure of the molten resin after the measurement without lowering the quality of the molded article.

The present invention has been made in view of such a situation, and provides a control method for an injection molding machine that can improve the quality of the molded article more reliably, and the injection molding machine.

Means for Solving Problem

In order to solve the above problem and achieve the object, a control method for an injection molding machine according to the present invention includes a measurement process of measuring molten resin by moving a screw backward while rotating the screw in a heating barrel for melting a resin material, wherein a rotational speed of the screw is reduced from a timing when a backward movement speed of the screw is reduced at the measurement process before the measurement process is completed, for stopping backward movement of the screw when the measurement process is completed, and the rotational speed and a rotation direction of the screw are controlled such that a back pressure as a pressure of the molten resin measured at the measurement process becomes a target pressure lower than the back pressure of when the measurement process is completed, when a target time comes.

In order to solve the above problem and achieve the object, an injection molding machine according to the present invention includes: a heating barrel in which a resin material is molten to be molten resin; a screw that is disposed rotatably in the heating barrel, and movable in an axis direction of rotation in the heating barrel; a back pressure detection unit that detects a back pressure as a pressure of the molten resin ejected by the screw in the heating barrel, and a control unit that controls rotation of the screw and movement of the screw, ejects the molten resin in the heating barrel by moving the screw backward while rotating the screw in the heating barrel, and measures the molten resin ejected by the screw, based on the back pressure detected by the back pressure detection unit, wherein the control unit reduces a rotational speed of the screw from a timing when a backward movement speed of the screw is reduced at a measurement process before the measurement process is completed, for stopping backward movement of the screw when the measurement process is completed, the measurement process being a process of measuring the molten resin, and controls the rotational speed and a rotation direction of the screw such that the back pressure detected by the back pressure detection unit becomes a target pressure lower than the back pressure of when the measurement process is completed, when a target time comes.

Effect of the Invention

The control method for the injection molding machine and the injection molding machine according to the present invention can improve the quality of the molded article more reliably.

DESCRIPTION OF EMBODIMENTS

The following describes a control method for an injection molding machine and the injection molding machine according to the present disclosure in detail based on the drawings. The present invention is not limited to the embodiment. Constituent elements in the following embodiment encompass a constituent element that can be replaced and easily conceivable by those skilled in the art, or substantially the same constituent element.

Embodiment

Figure 1:
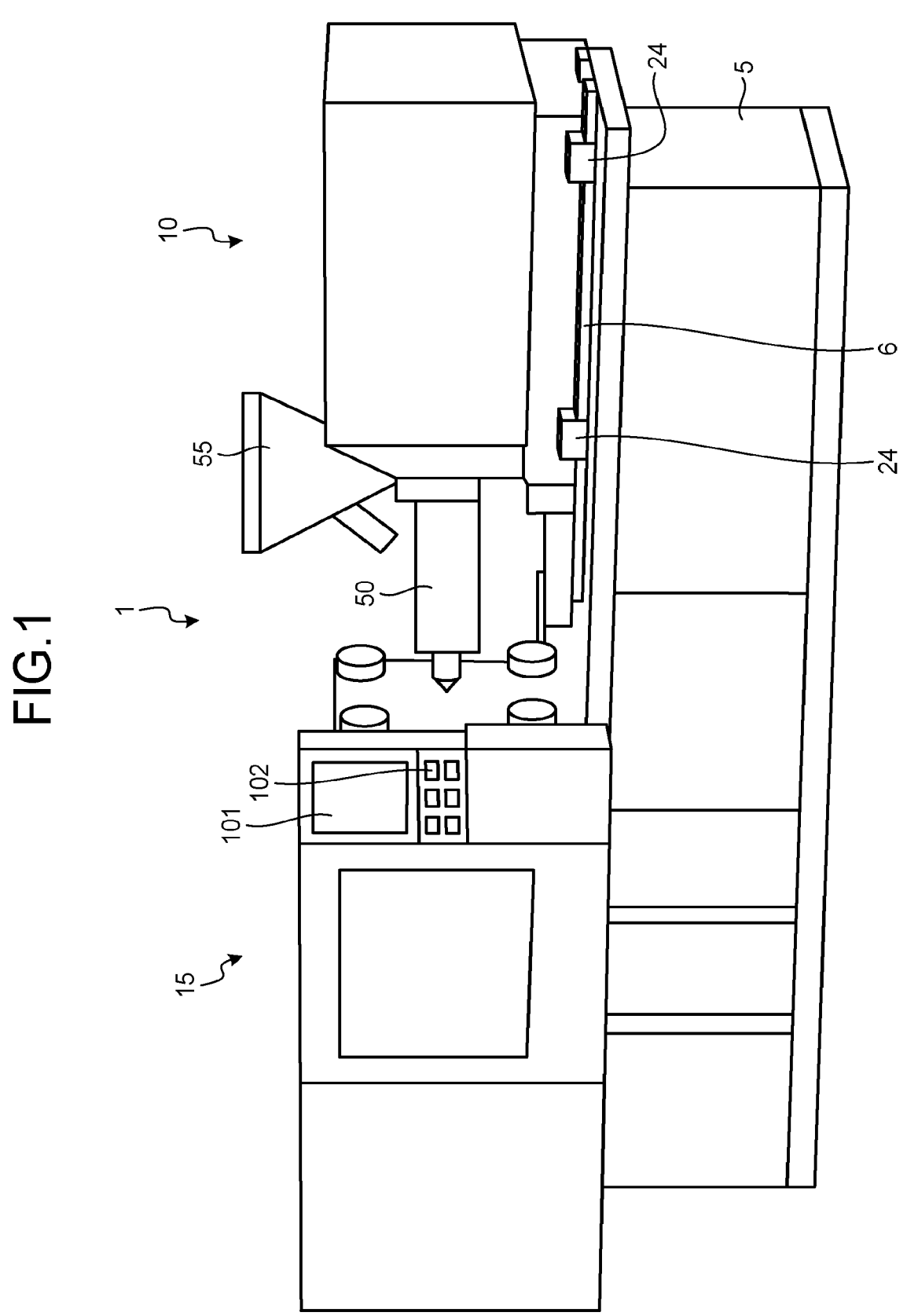
FIG. 1 is a perspective view of an injection molding machine according to an embodiment.
Figure 2:
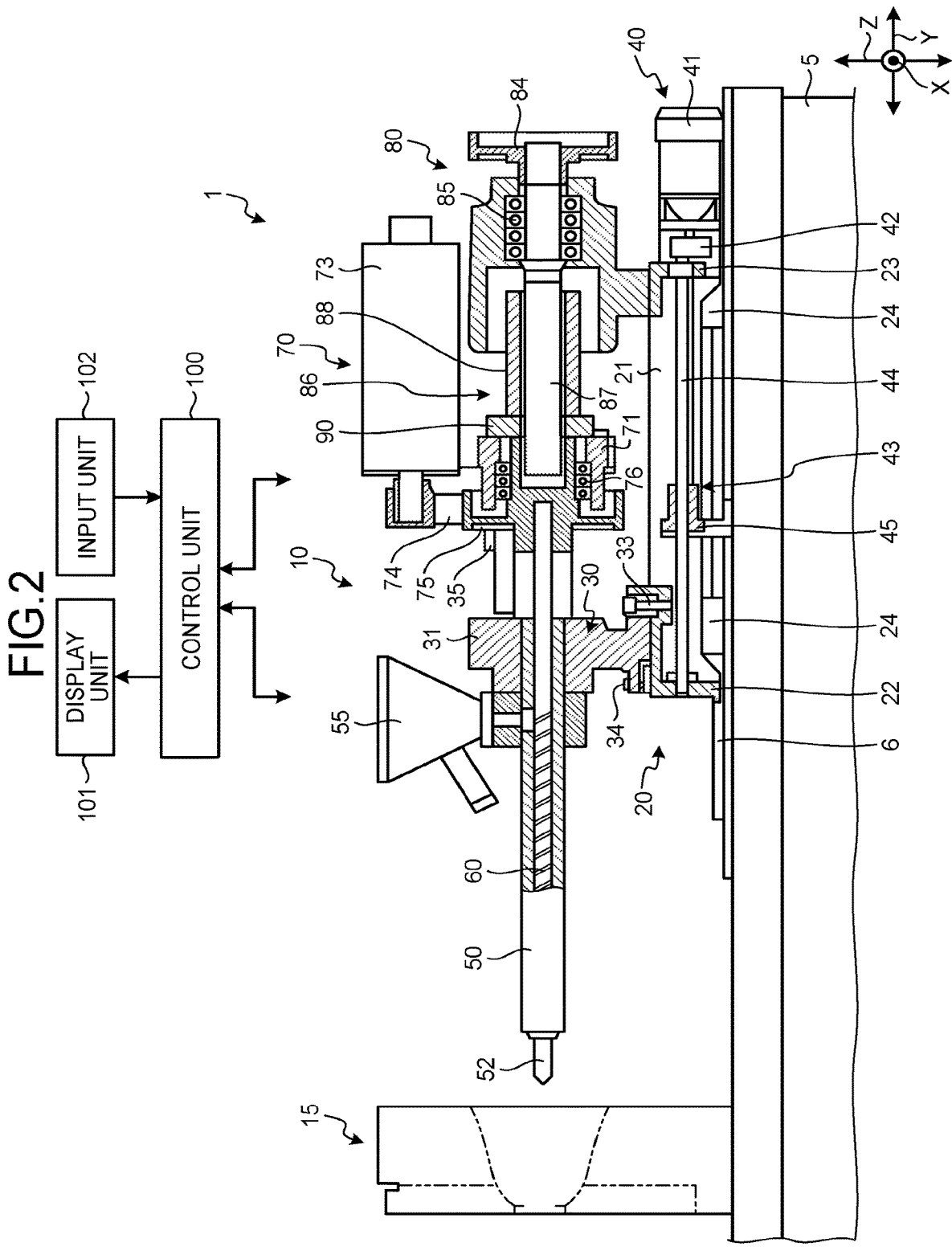
FIG. 2 is a cross-sectional view of a principal part illustrating a device configuration of the injection molding machine according to the embodiment.
Figure 3:
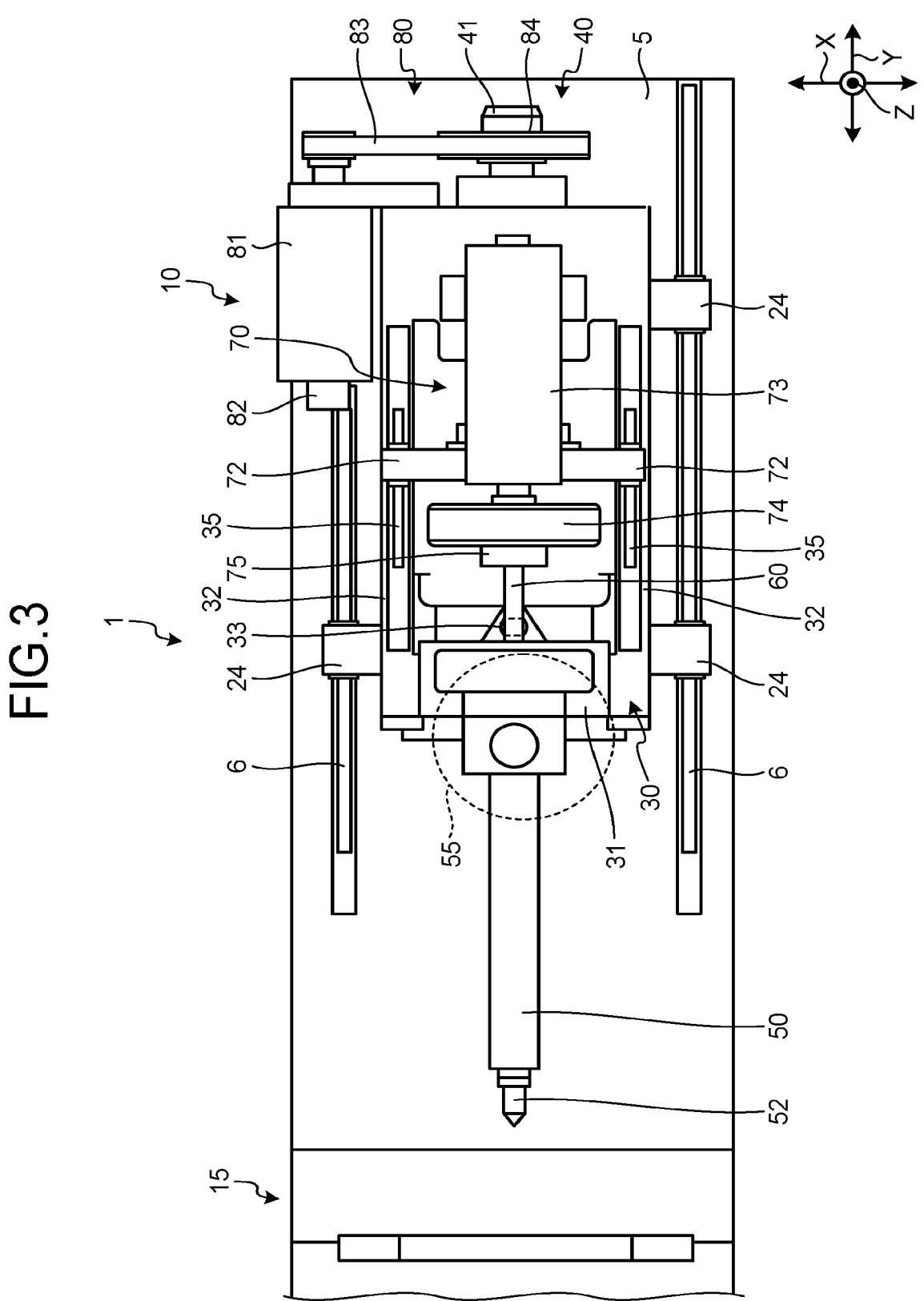
FIG. 3 is a plan view of a principal part illustrating a device configuration of the injection molding machine according to the embodiment.

FIG. 1 is a perspective view of an injection molding machine 1 according to the embodiment. FIG. 2 is a cross-sectional view of a principal part illustrating a device configuration of the injection molding machine 1 according to the embodiment. FIG. 3 is a plan view of a principal part illustrating a device configuration of the injection molding machine 1 according to the embodiment. In the following description, an upper and lower direction in a normal use state of the injection molding machine 1 is assumed to be an upper and lower direction Z of the injection molding machine 1, an upper side in the normal use state of the injection molding machine 1 is assumed to be an upper side of the injection molding machine 1, and a lower side in the normal use state of the injection molding machine 1 is assumed to be a lower side of the injection molding machine 1. Additionally, in the following description, a longitudinal direction Y of the injection molding machine 1 is also assumed to be the longitudinal direction Y of each part including the injection molding machine 1, and a direction orthogonal to both of the upper and lower direction Z and the longitudinal direction Y of the injection molding machine 1 is assumed to be a width direction X of the injection molding machine 1.

<Injection Molding Machine 1>

The injection molding machine 1 according to the present embodiment includes a base 5, and an injection device 10, a mold clamping device 15, and the like disposed on the base 5. In the vicinity of the center in the longitudinal direction Y of the injection molding machine 1, a display unit 101 that displays various kinds of information of the injection molding machine 1, and an input unit 102 used by an operator for performing an input operation on the injection molding machine 1.

The base 5 is formed in a substantially rectangular parallelepiped shape the longitudinal direction of which is the longitudinal direction Y of the injection molding machine 1, and a first rail 6 is disposed on an upper surface of the base 5. Two first rails 6 are disposed to be separated from each other in the width direction X on the base 5, and both of the two first rails 6 are formed to extend along the longitudinal direction of the base 5. The injection device 10 is placed on the first rails 6 to be movable along an extending direction of the first rails 6, and due to this, the injection device 10 is disposed to be movable in the longitudinal direction Y.

The mold clamping device 15 is disposed on one side of the injection device 10 in the longitudinal direction Y on the base 5. The mold clamping device 15 includes a mold clamping mechanism, and opens or closes a mold (not illustrated) assembled to the mold clamping mechanism. The mold clamping device 15 is preferably a servomotor driving type, but may be a hydraulic pressure driving type. The injection molding machine 1 according to the present embodiment includes covers on outer sides of the injection device 10 and the mold clamping device 15. FIG. 1 illustrates the injection device 10 and the mold clamping device 15 in a state of being covered with the covers, respectively.

<Injection Device 10>

In the following description, a side on which the mold clamping device 15 is positioned with respect to the injection device 10 in the longitudinal direction Y is assumed to be the front or a front side, and an opposite side of the side on which the mold clamping device 15 is positioned with respect to the injection device 10 in the longitudinal direction Y is assumed to be the rear or a rear side.

The injection device 10 includes a frame 20, a heating barrel 50, a screw 60, a rotation mechanism 70 that rotates the screw 60, a forward/backward movement mechanism 80 that moves the screw 60 forward or backward, and a propulsion mechanism 40 for the injection device 10. The frame 20 includes a base stand 21 and an upper frame 30 attached to the base stand 21. The base stand 21 is a frame body that is flat in the upper and lower direction Z, and leg parts 24 are disposed at four points including both sides in the longitudinal direction Y and both sides in the width direction X. The leg parts 24 at the four points are placed on the two first rails 6 disposed on the base 5 to be movable along the extending direction of the first rail 6. Due to this, the base stand 21 is supported to be slidable in the longitudinal direction Y with respect to the base 5.

The propulsion mechanism 40 includes an electric motor for driving 41 and a ball screw mechanism 43. The electric motor for driving 41 is attached to a rear wall 23 positioned behind the base stand 21 in the longitudinal direction Y. The electric motor for driving 41 is disposed so that a drive shaft thereof extends in the longitudinal direction Y, and the drive shaft of the electric motor for driving 41 passes through the rear wall 23 of the base stand 21 to be coupled to a screw part 44 of the ball screw mechanism 43 by a coupling mechanism 42. Due to this, at the time when the electric motor for driving 41 is driven, driving force of the electric motor for driving 41 is transmitted to the ball screw mechanism 43 from the drive shaft via the coupling mechanism 42, and the ball screw mechanism 43 can be rotated by the transmitted driving force.

The screw part 44 of the ball screw mechanism 43 is disposed to extend in the longitudinal direction Y to pass through substantially the center in the width direction X of the base stand 21, and a front end in the longitudinal direction Y is pivotably supported by the front wall 22 positioned at the front side of the base stand 21 in the longitudinal direction Y. A nut part 45 of the ball screw mechanism 43 is fixed to an upper surface of the base 5 on an inner side of the base stand 21. Due to this, in the propulsion mechanism 40, at the time when the electric motor for driving 41 is driven, the screw part 44 of the ball screw mechanism 43 is rotated by the driving force transmitted from the electric motor for driving 41, so that the screw part 44 can relatively move in an extending direction of the screw part 44 with respect to the nut part 45 fixed to the base 5. Thus, the propulsion mechanism 40 can move the base stand 21 supporting the screw part 44 in the longitudinal direction Y relative to the base 5 to which the nut part 45 is fixed, and move the frame 20 including the base stand 21 in the longitudinal direction Y on the first rails 6 disposed on the base 5. Due to this, the propulsion mechanism 40 can move the injection device 10 in the longitudinal direction Y.

The upper frame 30 is formed in a square frame body shape, and pivotally attached to a position in the vicinity of a front end of the base stand 21 in the longitudinal direction Y by a support pin 33. The upper frame 30 is also fixed in a state incapable of pivoting by a fixing screw 34 that fixes the upper frame 30 to the base stand 21 at a position other than the position where the support pin 33 is disposed. Due to this, the upper frame 30 is configured to be able to pivot about the support pin 33 as the center with respect to the base stand 21 when the fixing screw 34 is removed to release fixing by the fixing screw 34.

The upper frame 30 includes a front wall 31 disposed to rise upward from an attachment part to the base stand 21 in the upper and lower direction Z, and the heating barrel 50 is attached to the front wall 31 of the upper frame 30. The heating barrel 50 extends forward from the front wall 31 in the longitudinal direction Y, and a nozzle part 52 to be brought into close contact with the mold is disposed at a distal end of the heating barrel 50, that is, a front end of the heating barrel 50. Due to this, the heating barrel 50 is disposed above the frame 20 in the upper and lower direction Z and in front of the frame 20 in the longitudinal direction Y.

Specifically, the heating barrel 50 is formed in a substantially cylindrical shape, and disposed so that an axis direction thereof runs along the longitudinal direction Y. A heater 51 (refer to FIG. 4) such as a band heater is disposed thereon. Due to this, a resin material can be molten inside the heating barrel 50. That is, the temperature of the heating barrel 50 can be raised by the heater 51, and the resin material can be heated and molten to be molten resin as a plasticized material inside the heating barrel 50.

The screw 60 is disposed inside the heating barrel 50, and has a spiral shape the axis direction of which runs along the axis direction of the heating barrel 50. That is, the screw 60 includes a groove having a spiral shape on an outer peripheral surface. In this way, the screw 60 having the spiral shape can rotate about the axis as the center in the heating barrel 50. The screw 60 can move in an axis direction of rotation in the heating barrel 50. In other words, the screw 60 is disposed inside the heating barrel 50 so that a center axis of a cylinder as the shape of the heating barrel 50 is substantially aligned with a rotation axis of the screw 60, and disposed to be movable in the axis direction of the heating barrel 50. The screw 60 disposed rotatably in the heating barrel 50 can knead molten resin by rotating inside the heating barrel 50. Due to this, the heating barrel 50 is a barrel in which molten resin can be kneaded.

A hopper 55 is disposed in the vicinity of a portion of the heating barrel 50 on a side to be attached to the upper frame 30. The hopper 55 communicates with the inside of the heating barrel 50, and can supply pellets (not illustrated) as resin materials to be raw material resin to the heating barrel 50.

Furthermore, on the upper frame 30, second rails 35 are disposed on side walls 32 positioned on both sides in the width direction X of the upper frame 30. The second rails 35 extend in the longitudinal direction Y, that is, are formed to extend in substantially parallel with the heating barrel 50.

The rotation mechanism 70 is disposed behind the heating barrel 50 in the longitudinal direction Y, and can rotate the screw 60 disposed inside the heating barrel 50 about a center axis. The rotation mechanism 70 that rotates the screw 60 includes a rotation mechanism main body part 71, an electric motor for driving 73, a transmission belt 74, and a pulley 75. Among these, the rotation mechanism main body part 71 includes stays 72 extending in the width direction X, and the stays 72 are placed in a slidable manner on the second rails 35 at two points in the width direction X. Due to this, the rotation mechanism main body part 71 is placed on the second rails 35 in a movable manner via the stays 72.

The electric motor for driving 73 is placed above the rotation mechanism main body part 71. The pulley 75 is disposed in front of the rotation mechanism main body part 71, and disposed to be rotatable with respect to the rotation mechanism main body part 71 via a bearing 76. The pulley 75 is also coupled to a drive shaft of the electric motor for driving 73 via the transmission belt 74. Due to this, the pulley 75 can be rotated by driving force of the electric motor for driving 73 transmitted via the transmission belt 74. In this way, the pulley 75 that can be rotated by the driving force transmitted from the electric motor for driving 73 is fixed coaxially and integrally with the screw 60. In other words, a rear end side in the longitudinal direction Y of the screw 60 is coupled to the pulley 75. Due to this, the screw 60 disposed in the heating barrel 50 can be rotated integrally with the pulley 75 by the driving force transmitted from the electric motor for driving 73 to the pulley 75.

The forward/backward movement mechanism 80 is disposed in the rear of the rotation mechanism main body part 71 in the longitudinal direction Y. The forward/backward movement mechanism 80 can move the screw 60 disposed in the heating barrel 50 in the axis direction of the screw 60. That is, the screw 60 can be moved forward or backward in the longitudinal direction Y. Specifically, the forward/backward movement mechanism 80 includes an electric motor for driving 81, a transmission belt 83, a pulley 84, and a ball screw mechanism 86. Among these, the electric motor for driving 81 is disposed on a lateral side in the width direction X of the upper frame 30. The electric motor for driving 81 also includes an encoder 82 that detects a rotational position of the electric motor for driving 81, and a drive shaft of the electric motor for driving 81 is coupled to the pulley 84 via the transmission belt 83.

The pulley 84 is supported by the bearing 85 to be pivotable with respect to the upper frame 30. A screw part 87 of the ball screw mechanism 86 is integrally coupled to the pulley 84. The screw part 87 of the ball screw mechanism 86 is disposed coaxially with the screw 60, and also disposed coaxially with the pulley 75 included in the rotation mechanism main body part 71. A nut part 88 of the ball screw mechanism 86 included in the forward/backward movement mechanism 80 is formed in a substantially cylindrical shape, and the screw part 87 of the ball screw mechanism 86 is screwed to the nut part 88.

A load cell 90 is disposed between the nut part 88 of the ball screw mechanism 86 included in the forward/backward movement mechanism 80 and the rotation mechanism main body part 71 included in the rotation mechanism 70 in the longitudinal direction Y. The load cell 90 is disposed behind the rotation mechanism main body part 71 included in the rotation mechanism 70 and in front of the nut part 88 of the ball screw mechanism 86 included in the forward/backward movement mechanism 80.

The load cell 90 is a load measuring instrument that measures a load applied in the axis direction, and constituted of a strain body, a strain sensor attached to the strain body (both are not illustrated), and the like. In the present embodiment, the load cell 90 is disposed so that the axis direction is aligned with the longitudinal direction Y, and formed in a substantially cylindrical shape that is flat in the longitudinal direction Y. An inner diameter of the cylinder is larger than an outer diameter of the screw part 87 of the ball screw mechanism 86 included in the forward/backward movement mechanism 80. In the load cell 90 formed as described above, a front surface in the longitudinal direction Y is integrally fixed to the rotation mechanism main body part 71 included in the rotation mechanism 70, and a rear surface in the longitudinal direction Y is integrally fixed to the nut part 88 of the ball screw mechanism 86 included in the forward/backward movement mechanism 80. The load cell 90 disposed between the rotation mechanism main body part 71 of the rotation mechanism 70 and the nut part 88 of the ball screw mechanism 86 included in the forward/backward movement mechanism 80 can detect a load working in the longitudinal direction Y between the rotation mechanism main body part 71 and the nut part 88.

Figure 4:
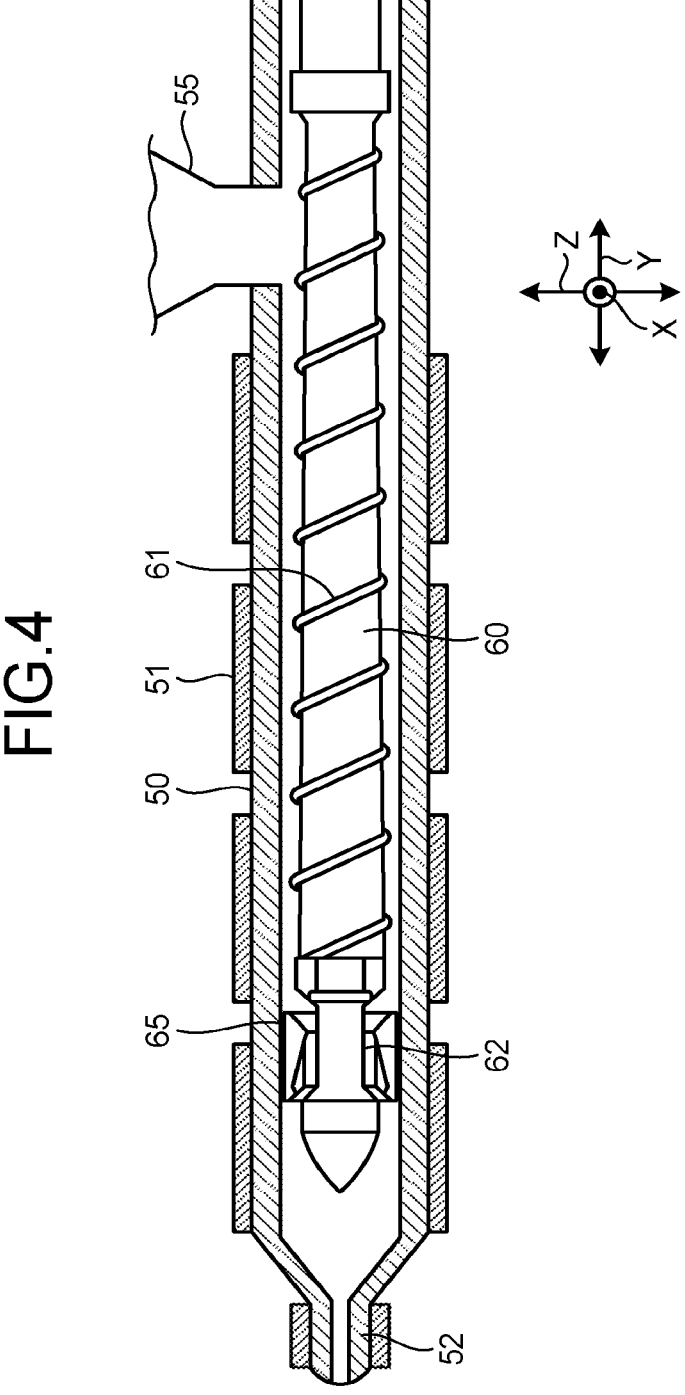
FIG. 4 is a detailed view of a heating barrel illustrated in FIG. 2.

FIG. 4 is a detailed view of the heating barrel 50 illustrated in FIG. 2. As illustrated in FIG. 4, the heating barrel 50 is formed in a substantially cylindrical shape, and the heater 51 such as a band heater is disposed on the outer peripheral surface thereof. The nozzle part 52 disposed at the front end in the longitudinal direction Y of the heating barrel 50 is formed in a substantially cylindrical shape the inner diameter of which is smaller than an inner diameter of the heating barrel 50, and disposed while opening forward in the longitudinal direction Y. The screw 60 disposed in the heating barrel 50 includes a flight 61 that projects toward an outer side in a radial direction of the screw 60 and is formed in a spiral shape centered on the axis of the screw 60. Due to this, the screw 60 includes a groove-like portion having a spiral shape between adjacent winding portions of the flight 61 formed in a spiral shape.

A check ring 65 is disposed in the vicinity of a front end of the screw 60 formed in this way in the longitudinal direction Y. The check ring 65 is disposed on a groove part 62 that is formed in the vicinity of the front end of the screw 60 in the longitudinal direction Y. The groove part 62 is a groove having a groove width direction aligned with the axis direction of the screw 60, and being formed along a circumference in a circumferential direction of the screw 60.

Figures 5, 6:
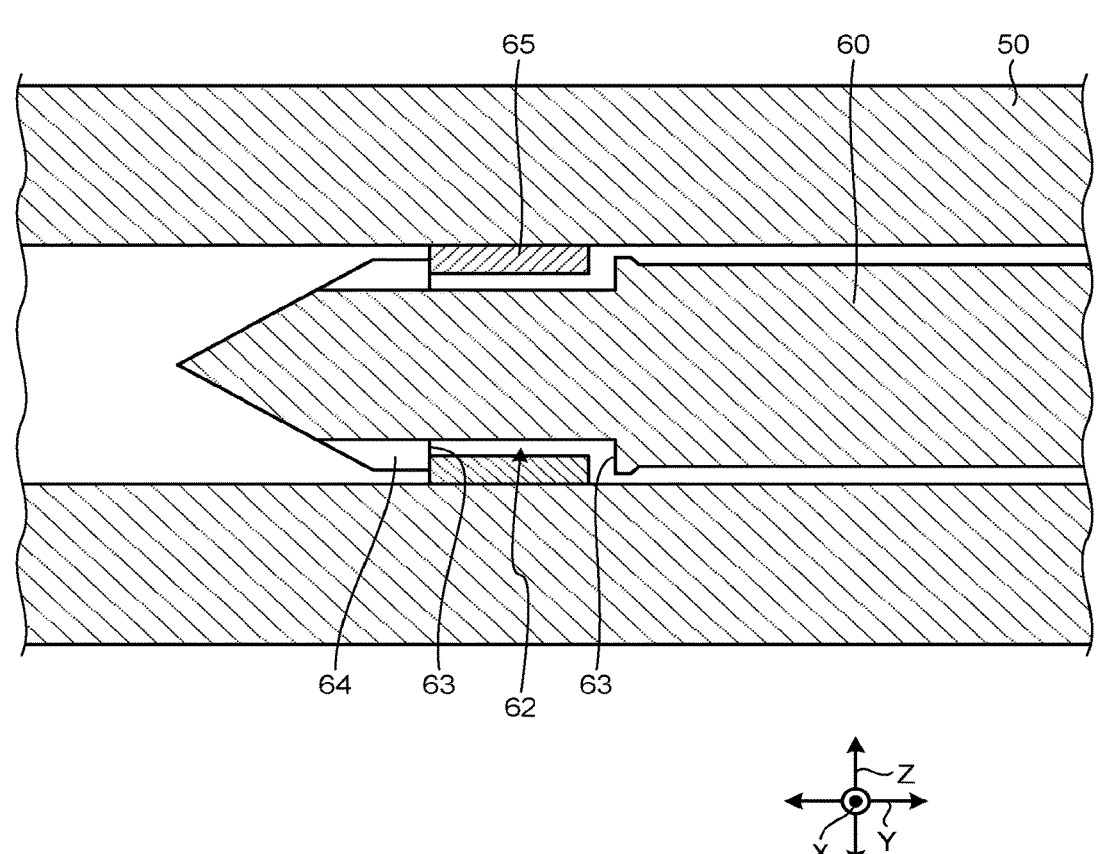
FIG. 5 is a detailed view of a check ring illustrated in FIG. 4.
FIG. 6 is an explanatory diagram of a period for performing pressure reduction control for molten resin.

FIG. 5 is a detailed view of the check ring 65 illustrated in FIG. 4. The check ring 65 is formed in a substantially cylindrical shape, and disposed in the groove part 62 of the screw 60 so that the axis thereof is substantially aligned with the axis of the screw 60. An outer diameter of the check ring 65 formed in a substantially cylindrical shape is substantially the same as the inner diameter of the heating barrel 50, and is slightly smaller than the inner diameter of the heating barrel 50. An inner diameter of the check ring 65 is larger than a diameter of a groove bottom of the groove part 62 of the screw 60, and a clearance is formed between an inner peripheral surface of the check ring 65 and the groove bottom of the groove part 62 of the screw 60. A width in the axis direction of the check ring 65 is smaller than a groove width of the groove part 62 of the screw 60. Due to this, the check ring 65 can move in the groove width direction in the groove part 62.

On the screw 60, a communicating part 64 is formed to cause the inside of the groove part 62 to communicate with a portion in front of the groove part 62 in the longitudinal direction Y. The communicating part 64 opens in the groove wall 63 at the front side of the groove part 62 in the groove width direction.

The injection molding machine 1 also includes a control unit 100 that performs various kinds of control for the injection molding machine 1. The control unit 100 includes a central processing unit (CPU) that performs arithmetic processing, a random access memory (RAM) and a read only memory (ROM) each functioning as a memory that stores various kinds of information, and the like. All or part of functions of the control unit 100 are implemented by loading an application program held in the ROM into the RAM to be executed by the CPU, and reading out and writing data from/into the RAM and the ROM.

The display unit 101 and the input unit 102 are both connected to the control unit 100, and the display unit 101 displays information transmitted from the control unit 100. The input unit 102 transmits information on which an input operation is performed to the control unit 100. The encoder 82 disposed on the electric motor for driving 81 of the forward/backward movement mechanism 80 and the load cell 90 disposed between the forward/backward movement mechanism 80 and the rotation mechanism 70 are connected to the control unit 100, and can transmit a detection result to the control unit 100. Furthermore, the heater 51 included in the injection device 10, the electric motor for driving 73 of the rotation mechanism 70, the electric motor for driving 81 of the forward/backward movement mechanism 80, and the electric motor for driving 41 included in the propulsion mechanism 40 are connected to the control unit 100, and are operated by a control signal from the control unit 100.

<Effect of Injection Molding Machine 1>

The injection molding machine 1 according to the present embodiment includes the configuration as described above. The following describes an effect thereof. The injection molding machine 1 repeatedly performs a cycle of an injection/molding operation assuming one time of injection/molding operation as one cycle. FIG. 6 is an explanatory diagram of a period for performing pressure reduction control for molten resin. In FIG. 6, an upper column illustrates a processing process with the mold clamping device 15, and a lower column illustrates a processing process with the injection device 10. Each cycle includes a plurality of processes for injecting the resin material used for molding and molding a product. Each cycle includes, for example, an injection process, a cooling process, a mold opening process, a taking-out process, an intermediate process, a mold closing process, and a measurement process.

The injection process is a process of pressing the nozzle part 52 included in the heating barrel 50 of the injection device 10 against a through hole of a fixed mold (not illustrated) included in the mold clamping device 15, and injecting molten resin as a resin material molten by the heating barrel 50 into a space between a movable mold (not illustrated) and the fixed mold.

The cooling process is a process in which a temperature of molded resin is lowered and the molded resin is solidified, the molded resin as the resin material injected into the space between the movable mold and the fixed mold included in the mold clamping device 15, and a process of standing by for a certain time until the molded resin becomes a molded article.

The mold opening process is a process of separating the movable mold from the fixed mold to take out the molded article molded by the movable mold and the fixed mold included in the mold clamping device 15.

The taking-out process is a process of ejecting the molded article from the movable mold by an ejection member (not illustrated) included in the mold clamping device 15 to remove the molded article from the movable mold.

The intermediate process is a process of moving, to a predetermined position, and acquiring the molded article ejected from the movable mold.

The mold closing process is a process of combining the movable mold and the fixed mold included in the mold clamping device 15 to form a space corresponding to a product shape between the movable mold and the fixed mold.

The measurement process is a process of feeding the molten resin to be injected in the next cycle toward the end at which the nozzle part 52 of the heating barrel 50 included in the injection device 10 is positioned, and preparing the resin material to be used in the next cycle. The measurement process is performed in a period in which the cooling process is performed by the mold clamping device 15 as illustrated in FIG. 6.

In molding the molded article by the injection molding machine 1, the cycle of these injection/molding operations are repeatedly performed. To smoothly inject the resin material inside the heating barrel 50 in the repeatedly performed cycle, the control unit 100 continuously heats the inside of the heating barrel 50 by the heater 51. Due to this, the heating barrel 50 holds the resin material in a molten state.

The control unit 100 performs control while determining a start timing or an end timing of each process in the cycle of the injection/molding operation. To determine the start timing or the end timing of each process, for example, a flag is defined in advance for the first step or the last step of each process in a computer program for causing the control unit 100 to operate the injection molding machine 1. Due to this, the control unit 100 can determine the start timing or the end timing of each process during execution of the computer program for causing the injection molding machine 1 to operate. That is, by defining the flag, the control unit 100 can determine that the process proceeds to the next process when the flag is executed before the processing or after the processing of a step in each process.

When the process proceeds, the control unit 100 causes the display unit 101 to display proceeding of the process. That is, the display unit 101 displays a current process of the injection molding machine 1. Due to this, the operator can recognize a current operation state of the injection molding machine 1 by visually recognizing the display unit 101.

<Measurement Process>

The injection molding machine 1 according to the present embodiment performs control for reducing the pressure of the resin material measured in the measurement process among the processes in the cycle of the injection/molding operations. First, the following describes the measurement process that is performed before pressure reduction control for the resin material in detail. The resin material measured in the measurement process is put into the hopper 55 in a state of pellets, and supplied from the hopper 55 into the heating barrel 50. An inside temperature of the heating barrel 50 becomes high when the heating barrel 50 is heated by the heater 51, and the resin material supplied into the heating barrel 50 in the state of pellets is molten inside the heating barrel 50 to be the molten resin.

In the measurement process, the screw 60 is moved rearward in the longitudinal direction Y while the screw 60 is rotated inside the heating barrel 50 in which the resin material is molten as described above. The screw 60 is rotated by the rotation mechanism 70. That is, the screw 60 is rotated when the electric motor for driving 73 included in the rotation mechanism 70 is driven, the driving force generated in the electric motor for driving 73 is transmitted to the pulley 75 by the transmission belt 74, and the driving force is transmitted from the pulley 75 to the screw 60.

Herein, a rotation direction of the screw 60 is a direction with which the molten resin positioned between adjacent winding portions of the flight 61 of the screw 60 can be fed, by rotation of the screw 60, to the front end side in the longitudinal direction Y, that is, a side on which the nozzle part 52 is positioned. In the following description, of rotation directions of the screw 60, a direction with which the molten resin can be fed forward in the longitudinal direction Y is assumed to be normal rotation, and an opposite direction thereof is assumed to be reverse rotation.

Rearward movement of the screw 60 in the longitudinal direction Y, that is, backward movement of the screw 60 is performed by the forward/backward movement mechanism 80. At the time when the screw 60 is moved backward by the forward/backward movement mechanism 80, the electric motor for driving 81 included in the forward/backward movement mechanism 80 is driven, the driving force generated in the electric motor for driving 81 is transmitted to the pulley 84 by the transmission belt 83, and further transmitted from the pulley 84 to the screw part 87 of the ball screw mechanism 86 to rotate the screw part 87. Due to this, the nut part 88 of the ball screw mechanism 86 is moved in the longitudinal direction Y, and the load cell 90 and the entire rotation mechanism 70 are moved in the longitudinal direction Y while being supported by the second rail 35 together with the nut part 88. Accordingly, the screw 60 coupled to the pulley 75 of the rotation mechanism 70 is also moved in the longitudinal direction Y together with the pulley 75 of the rotation mechanism 70, and the screw 60 moves backward.

In the measurement process, by rotating the screw 60 by normal rotation while moving the screw 60 backward as described above, the molten resin in the heating barrel 50 is fed to the front end side of the heating barrel 50 by the screw 60. That is, in the measurement process, the control unit 100 controls rotation of the screw 60 and movement of the screw 60 to eject the molten resin in the heating barrel 50 to the front end side of the heating barrel 50. At this point, the control unit 100 measures the molten resin using a movement amount of the screw 60 at the time of ejecting the molten resin to a portion on the front end side of the heating barrel 50 while moving the screw 60 backward, and the pressure of the molten resin set to the portion on the front end side of the heating barrel 50.

In this case, measurement of the molten resin means accumulating a certain amount of the molten resin to be injected to the mold (not illustrated) included in the mold clamping device 15 in one injection process in a portion positioned in front of the check ring 65 in the longitudinal direction Y inside the heating barrel 50, and securing the certain amount of the molten resin used for one injection process.

Herein, the check ring 65 disposed on the screw 60 is pushed forward by the molten resin fed forward at the time when the molten resin is fed to the front end side in the measurement process, and pressed against the groove wall 63 on the front side of the groove part 62 formed on the screw 60 (refer to FIG. 5). Due to this, a clearance is formed between the check ring 65 and the groove wall 63 behind the groove part 62 formed on the screw 60, so that the molten resin positioned behind the check ring 65 passes through the clearance, and further passes through a space between the inner peripheral surface of the check ring 65 and the groove bottom of the groove part 62 to be ejected to the communicating part 64. Due to this, at the time when the molten resin is ejected in front of the check ring 65 by the screw 60 in the measurement process, the molten resin positioned behind the check ring 65 is ejected in front of the check ring 65.

Regarding control in the measurement process, a movement amount of the screw 60 is acquired based on a detection result of the encoder 82 included in the electric motor for driving 81 of the forward/backward movement mechanism 80. That is, the forward/backward movement mechanism 80 moves the screw 60 in the longitudinal direction Y by transmitting the driving force generated in the electric motor for driving 81 to the screw 60, and the encoder 82 can detect a rotational position of a rotating body (not illustrated) included in the electric motor for driving 81. Thus, the control unit 100 acquires a position in the longitudinal direction Y of the screw 60 by acquiring the rotational position of the rotating body of the electric motor for driving 81 detected by the encoder 82.

The encoder 82 included in the electric motor for driving 81 of the forward/backward movement mechanism 80 serves as a screw position detection unit that detects the position in the longitudinal direction Y of the screw 60 in the heating barrel 50. In the measurement process, the control unit 100 acquires a backward movement amount of the screw 60 by acquiring the position in the longitudinal direction Y of the screw 60 based on the detection result of the encoder 82 included in the electric motor for driving 81 of the forward/backward movement mechanism 80.

The pressure of the molten resin fed to the portion on the front end side of the heating barrel 50 is detected by using a detection result of the load cell 90. The load cell 90 is used as a back pressure detection unit that detects a back pressure, which is the pressure of the molten resin that is ejected to the front end side by the screw 60, in the heating barrel 50.

The following describes detection of the back pressure of the molten resin by the load cell 90. In a case of ejecting the molten resin in the heating barrel 50 to the front end side in the heating barrel 50 by the screw 60, rearward force in the longitudinal direction Y works on the screw 60 due to a counteraction at the time when the molten resin is ejected forward. The force in the longitudinal direction Y that has worked on the screw 60 is transmitted from the screw 60 to the pulley 75 of the rotation mechanism 70, and further transmitted from the pulley 75 to the rotation mechanism main body part 71 to be transmitted to the load cell 90 fixed to the rotation mechanism main body part 71.

A surface of the load cell 90 on the opposite side of a surface fixed to the rotation mechanism main body part 71 is fixed to the nut part 88 of the ball screw mechanism 86 included in the forward/backward movement mechanism 80, so that the rearward force in the longitudinal direction Y from the rotation mechanism main body part 71 of the rotation mechanism 70 to the load cell 90 works as force of compressing the load cell 90 in the longitudinal direction Y. The load cell 90 detects magnitude of the force working on the load cell 90 as described above, and transmits it to the control unit 100. The control unit 100 acquires the magnitude of the force transmitted from the load cell 90 as force working in the longitudinal direction Y on the screw 60.

In the measurement process, the control unit 100 acquires the back pressure of the molten resin that is ejected forward by the screw 60 by acquiring the magnitude of the force working in the longitudinal direction Y on the screw 60 based on the detection result of the load cell 90. That is, in the measurement process, the control unit 100 acquires the amount of the molten resin ejected to the distal end side as a side on which the nozzle part 52 of the heating barrel 50 is positioned, and measures the molten resin by acquiring the position in the longitudinal direction Y of the screw 60 based on the detection result of the encoder 82 and acquiring the back pressure of the molten resin based on the detection result of the load cell 90.

As described above, in the measurement process, the control unit 100 ejects the molten resin to the distal end side in the heating barrel 50 by moving the screw 60 backward while rotating the screw 60 in the heating barrel 50, and measures the molten resin ejected by the screw 60 based on the position of the screw 60 detected by the encoder 82 and the back pressure detected by the load cell 90. In this way, in the measurement process, a certain amount of the molten resin is measured, the certain amount of the molten resin to be injected to the mold included in the mold clamping device 15 from the heating barrel 50 in one injection process.

Herein, in the measurement process, the pressure of the molten resin to be injected in the injection process is high, but if the pressure of the molten resin remains high, a failure is caused such that the molten resin leaks out from the nozzle part 52, for example, at the time when the molded article is taken out from the mold. Thus, in the present embodiment, pressure reduction is performed for the measured molten resin. Next, the following describes pressure reduction control for the molten resin measured in the measurement process.

<Pressure Reduction Control for Measured Resin>

Figure 7:
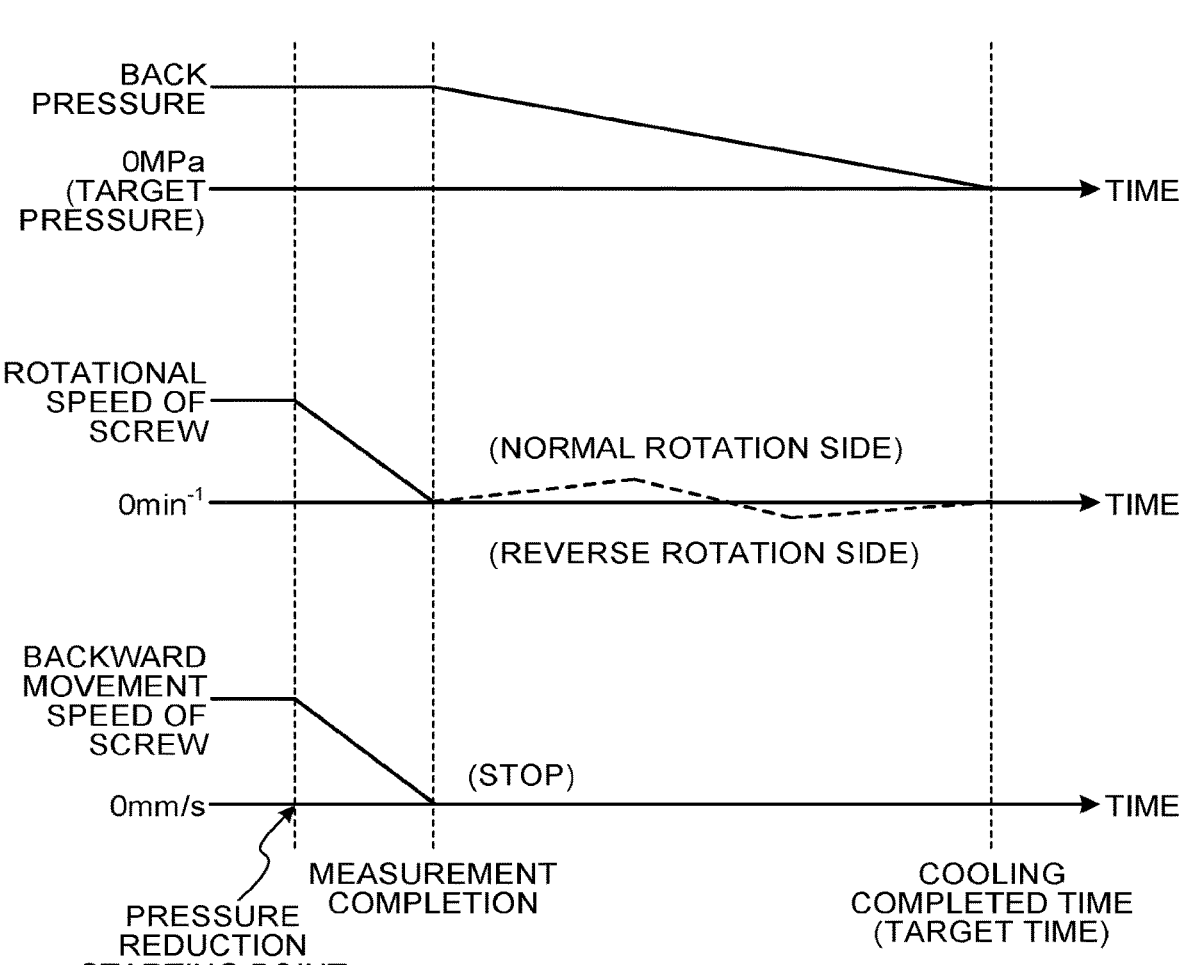
FIG. 7 is an explanatory diagram of pressure reduction control for molten resin performed by the injection molding machine according to the embodiment.

FIG. 7 is an explanatory diagram of pressure reduction control for the molten resin performed by the injection molding machine 1 according to the embodiment. Pressure reduction control for the molten resin measured in the measurement process is performed in a period in which the cooling process is performed by the mold clamping device 15. That is, the measurement process is also performed in the period in which the cooling process is performed, so that the measurement process and the pressure reduction control for the molten resin are both performed in the period in which the cooling process is performed, and the injection device 10 successively performs the measurement process and the pressure reduction control during the period in which the cooling process is performed by the mold clamping device 15.

In the measurement process, the molten resin is ejected to the distal end side of the heating barrel 50 by the screw 60 while the screw 60 is moved backward. The control unit 100 controls a moving speed of the screw 60 so that the screw 60 stops at a position in the longitudinal direction Y where measurement of the molten resin is completed.

That is, the control unit 100 starts to reduce, at a timing before measurement of the molten resin is completed, the backward movement speed of the screw 60 that moves backward in the measurement process. Alternatively, the backward movement speed of the screw 60 that moves backward in the measurement process starts to be reduced at a position in front of the position of the screw 60 in the longitudinal direction Y at the time when measurement of the molten resin is completed, in the longitudinal direction Y. In this way, the timing when the backward movement speed of the screw 60 starts to be reduced, or the position where the backward movement speed starts to be reduced is a pressure reduction starting point. In this case, the pressure reduction starting point encompasses meaning of both of the temporal timing when the backward movement speed of the screw 60 starts to be reduced and the spatial position in the longitudinal direction Y where the speed of the screw 60 starts to be reduced.

Additionally, in the measurement process, a rotational speed of the screw 60 that normally rotates starts to be reduced at the pressure reduction starting point. That is, the control unit 100 reduces the rotational speed of the screw 60 from a timing when the backward movement speed of the screw 60 is reduced in the measurement time process before the measurement process is completed, for stopping the backward movement of the screw 60 at the time when the measurement process is completed. In this way, the pressure reduction starting point for starting to reduce the backward movement speed of the screw 60 and starting to reduce the rotational speed of the screw 60 is the timing or position for starting to control pressure reduction for the molten resin the pressure of which is increased in the measurement process.

Regarding the backward movement of the screw 60 in the longitudinal direction Y in the measurement process, the backward movement speed starts to be reduced at the pressure reduction starting point, the backward movement speed becomes 0 at the timing when measurement of the molten resin is completed, and movement of the screw 60 in the longitudinal direction Y is stopped. Regarding the rotational speed of the screw 60 in the measurement process, the rotational speed starts to be reduced at the pressure reduction starting point, and at the timing when measurement of the molten resin is completed and the backward movement speed of the screw 60 becomes 0, the rotational speed becomes 0 and the rotation is stopped, or the rotational speed becomes close to 0.

Regarding the back pressure of the molten resin in a period from the pressure reduction starting point until measurement is completed, the back pressure tends to be reduced as the rotational speed of the screw 60 is reduced but the back pressure tends to be maintained as the backward movement speed of the screw 60 is reduced, so that influences of both effects on the back pressure are canceled each other, and the back pressure is not largely changed or only slightly reduced.

When the measurement process is completed, and the backward movement speed of the screw 60 becomes 0 and movement of the screw 60 in the longitudinal direction Y is stopped, the rotational speed and the rotation direction of the screw 60 are controlled so that the back pressure of the molten resin measured in the measurement process becomes a target pressure lower than the back pressure at the time when the measurement process is completed when the target time comes. That is, the control unit 100 controls the rotational speed and the rotation direction of the screw 60 so that the back pressure detected by the load cell 90 becomes the target pressure when the target time comes.

In the present embodiment, the target time is a time when cooling of the molded resin, which is the molten resin injected into the mold (not illustrated), is completed in the mold for molding the molten resin molten in the heating barrel 50. That is, the target time is a cooling completed time as a time when the cooling process by the mold clamping device 15 is completed. In the present embodiment, the target pressure is 0 MPa. Due to this, the control unit 100 controls the rotational speed and the rotation direction of the screw 60 so that the back pressure of the molten resin detected by the load cell 90 becomes 0 MPa at the cooling completed time.

At the time of controlling the rotational speed and the rotation direction of the screw 60 so that the back pressure of the molten resin becomes the target pressure when the target time comes, the control unit 100 controls the rotational speed and the rotation direction of the screw 60 so that the back pressure of the molten resin is gently reduced from the pressure at the time when measurement is completed to the target pressure from the time when measurement of the molten resin is completed to the target time. Control of the back pressure of the molten resin by the control unit 100 is performed while setting a pressure reduction control target indicating a change in the back pressure with respect to a change of the time from the time when measurement of the molten resin is completed to the target time. For example, the pressure reduction control target is set by setting a linear function indicating that the back pressure of the molten resin is changed from a pressure at the time when measurement is completed to the target pressure in a period from the time when measurement of the molten resin is completed to the target time, and setting the linear function as the pressure reduction control target.

The control unit 100 continuously compares the pressure reduction control target with the back pressure of the molten resin that is acquired based on a detection result of the load cell 90 in a period from when measurement of the molten resin is completed to the target time. The control unit 100 performs control to increase the back pressure in a case in which the acquired back pressure is lower than the pressure reduction control target, and performs control to reduce the back pressure in a case in which the acquired back pressure is higher than the pressure reduction control target.

The control for adjusting the back pressure of the molten resin is performed by controlling rotation of the screw 60. That is, movement of the screw 60 in the longitudinal direction Y is stopped, so that the back pressure of the molten resin is increased in a case in which the screw 60 normally rotates, and the back pressure of the molten resin is reduced in a case in which the screw 60 reversely rotates. Due to this, in a case in which the back pressure of the molten resin that is acquired based on the detection result of the load cell 90 is lower than the pressure reduction control target at the same time, the screw 60 is normally rotated. In contrast, in a case in which the back pressure of the molten resin that is acquired based on the detection result of the load cell 90 is higher than the pressure reduction control target at the same time, the screw 60 is reversely rotated. In both cases, the rotational speed of the screw 60 is increased in a case in which the difference between the pressure reduction control target and the back pressure of the molten resin that is acquired based on the detection result of the load cell 90 is large, and the rotational speed of the screw 60 is reduced in a case in which the difference is small.

The back pressure of the molten resin positioned on the distal end side in the heating barrel 50 becomes the target pressure when the target time comes due to the pressure reduction control described above that is performed after measurement in the measurement process is completed. That is, in the present embodiment, the back pressure of the molten resin is gradually reduced after the measurement process is completed, and becomes 0 MPa as the target pressure at a timing when the cooling completed time as the target time comes. By performing control for reducing the back pressure of the molten resin after the measurement process as described above, the back pressure is gently reduced toward the target time, and reduced to be the target pressure when the target time comes.

Herein, the pressure reduction control for the back pressure of the molten resin is performed by rotating the screw 60 in the heating barrel 50, so that, in the pressure reduction control, not only the back pressure of the molten resin positioned at the distal end in the heating barrel 50 but also the pressure of the entire molten resin positioned in the heating barrel 50 is changed. Next, the following describes a change in the pressure of the entire molten resin in the heating barrel 50 at the time of pressure reduction control for the back pressure of the molten resin.

<Change in Pressure of Molten Resin in Heating Barrel 50>

Figure 8:
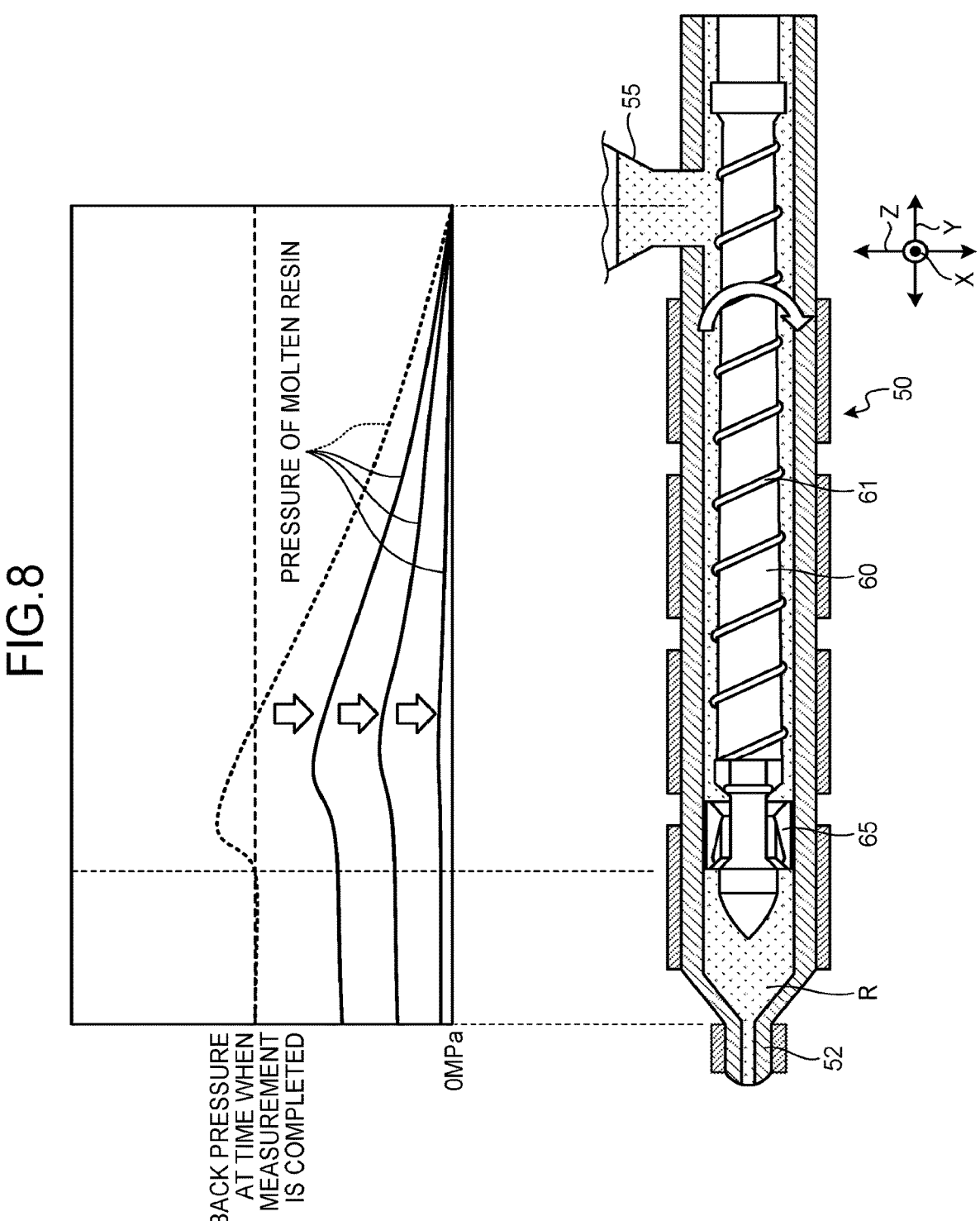
FIG. 8 is an explanatory diagram of a change in a pressure of molten resin inside the entire heating barrel at the time when pressure reduction control is performed.

FIG. 8 is an explanatory diagram of a change in the pressure of the molten resin inside the entire heating barrel 50 at the time when pressure reduction control is performed. FIG. 8 is a diagram illustrating a pressure of molten resin R for each position in the longitudinal direction Y of the heating barrel 50. The pressure of the molten resin R indicated by a graph at the upper side of FIG. 8 indicates a change in the pressure due to the pressure reduction control at each position in the longitudinal direction Y of the heating barrel 50 on a lower side thereof.

In control for reducing the back pressure of the molten resin R, the back pressure is reduced by rotating the screw 60, so that the pressure of the molten resin R positioned in the heating barrel 50 is changed following the rotation of the screw 60 at a portion other than the distal end side in the heating barrel 50, that is, a portion not positioned in front of the check ring 65. Specifically, in the pressure reduction control for the back pressure of the molten resin R, rotation of the screw 60 is continuously controlled from the timing when measurement is completed until the target time for gently reducing the back pressure after the measurement process is completed. Due to this, the molten resin R positioned behind the check ring 65 in the heating barrel 50 is also moved in the longitudinal direction Y following the rotation of the screw 60.

At this point, in the molten resin R positioned behind the check ring 65, the pressure applied to a forward direction by the flight 61 of the screw 60 in the measurement process is reduced, or a direction of the pressure becomes a rearward direction. Accordingly, when the pressure reduction control for the back pressure of the molten resin R is performed, as the back pressure is gently reduced, the pressure of the molten resin R positioned behind the check ring 65 is also gradually reduced as illustrated in FIG. 8.

Effects of Embodiment

With the control method for the injection molding machine 1 and the injection molding machine 1 according to the embodiment described above, the rotational speed of the screw 60 is reduced from a timing when the backward movement speed of the screw 60 is reduced in the measurement process before the measurement process is completed, for stopping the backward movement of the screw 60 at the time when the measurement process is completed, so that, at the timing when backward movement of the screw 60 is stopped, the rotation of the screw 60 can be stopped or the rotational speed can be made close to 0. Due to this, it is possible to prevent the back pressure of the molten resin R from being abruptly reduced because the rotation of the screw 60 is stopped before backward movement of the screw 60 is stopped, or prevent the back pressure of the molten resin R from being abruptly increased because the screw 60 continuously rotates even after backward movement of the screw 60 is stopped.

Furthermore, after the measurement process is completed, the rotational speed and the rotation direction of the screw 60 are controlled so that the back pressure of the molten resin R becomes the target pressure when the target time comes, so that it is possible to prevent the pressure of the molten resin R in the heating barrel 50 from being abruptly changed.

That is, as a method for reducing the back pressure of the molten resin R after the measurement process is completed, exemplified are suck-back and a method for reversely rotating the screw 60 by a predetermined rotation angle for a short time as methods assumed for the injection molding machine 1 in the related art. However, in a case of using such methods, the pressure of the molten resin R is abruptly changed, so that a failure may be caused.

Figure 9:
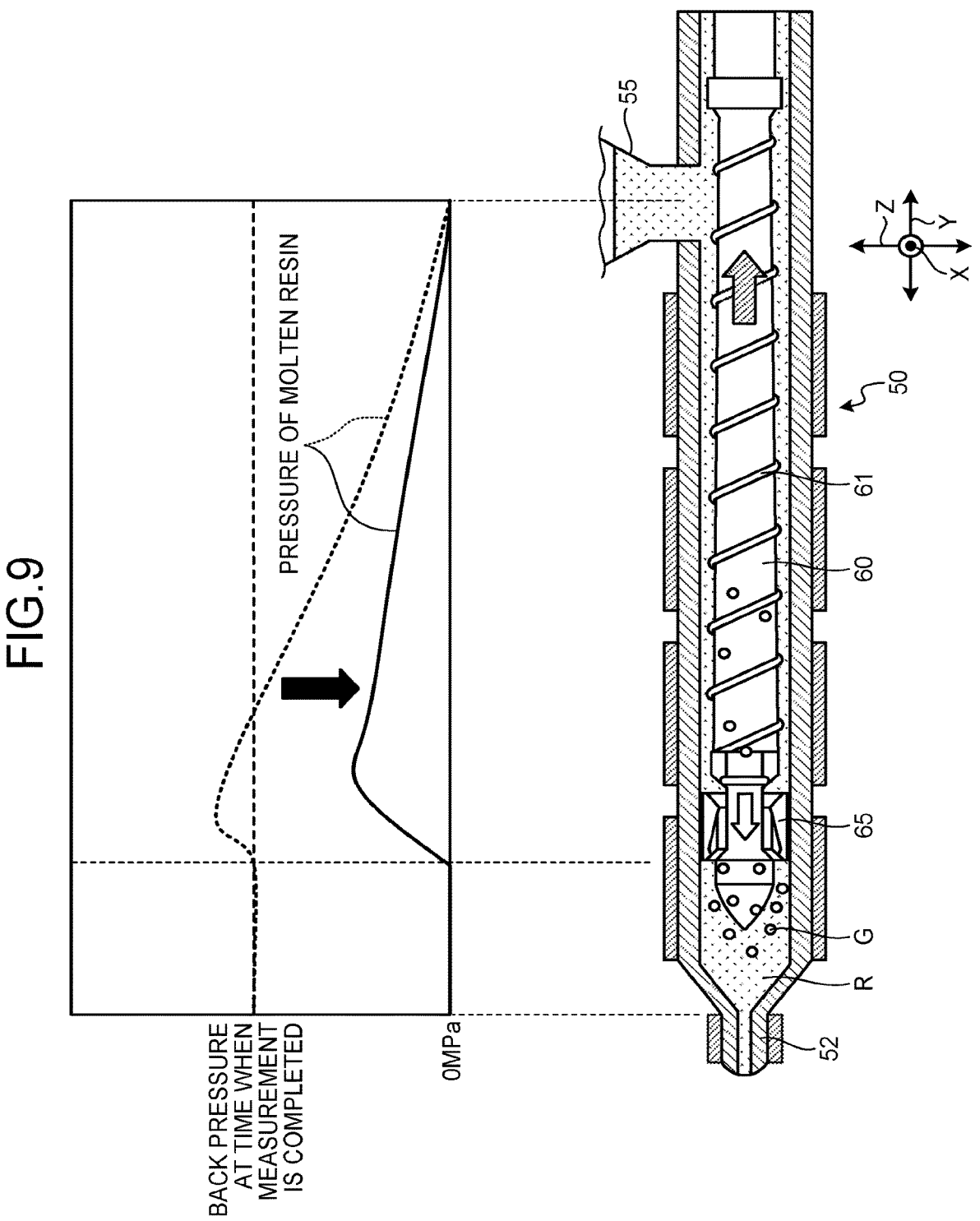
FIG. 9 is an explanatory diagram of a change in a pressure of molten resin inside the entire heating barrel at the time when suck-back is performed.

FIG. 9 is an explanatory diagram of a change in the pressure of the molten resin R inside the entire heating barrel 50 at the time when suck-back is performed. FIG. 9 is an explanatory diagram of a change in the pressure of the molten resin R at the time when the screw 60 is moved backward while rotation thereof is stopped, that is, what is called suck-back is performed. In a case of performing suck-back for the purpose of reducing the back pressure of the molten resin R on the distal end side in the heating barrel 50 after the measurement process is completed, as illustrated in FIG. 9, the back pressure of the molten resin R on the distal end side in the heating barrel 50 abruptly becomes 0 MPa.

Due to this, in the heating barrel 50, the pressure of the molten resin R positioned behind the check ring 65 is more easily increased than the pressure of the molten resin R positioned in front of the check ring 65. Due to this, regarding the molten resin R in the heating barrel 50, the molten resin R positioned behind the check ring 65 in the heating barrel 50 passes through the check ring 65 to easily flow in front of the check ring 65. Thus, an amount of the molten resin R measured in front of the check ring 65 in the measurement process is changed, and a weight of the molded article molded by using the molten resin R can be easily changed with respect to a desired weight.

In a case in which the back pressure of the molten resin R is abruptly reduced by performing suck-back after the measurement process, the gas G tends to be generated from the molten resin R. In this case, what is called a silver streak, which is a silver trace, may be easily generated on the surface of the molded article molded by using the molten resin R due to the gas G generated from the molten resin R.

Figure 10:
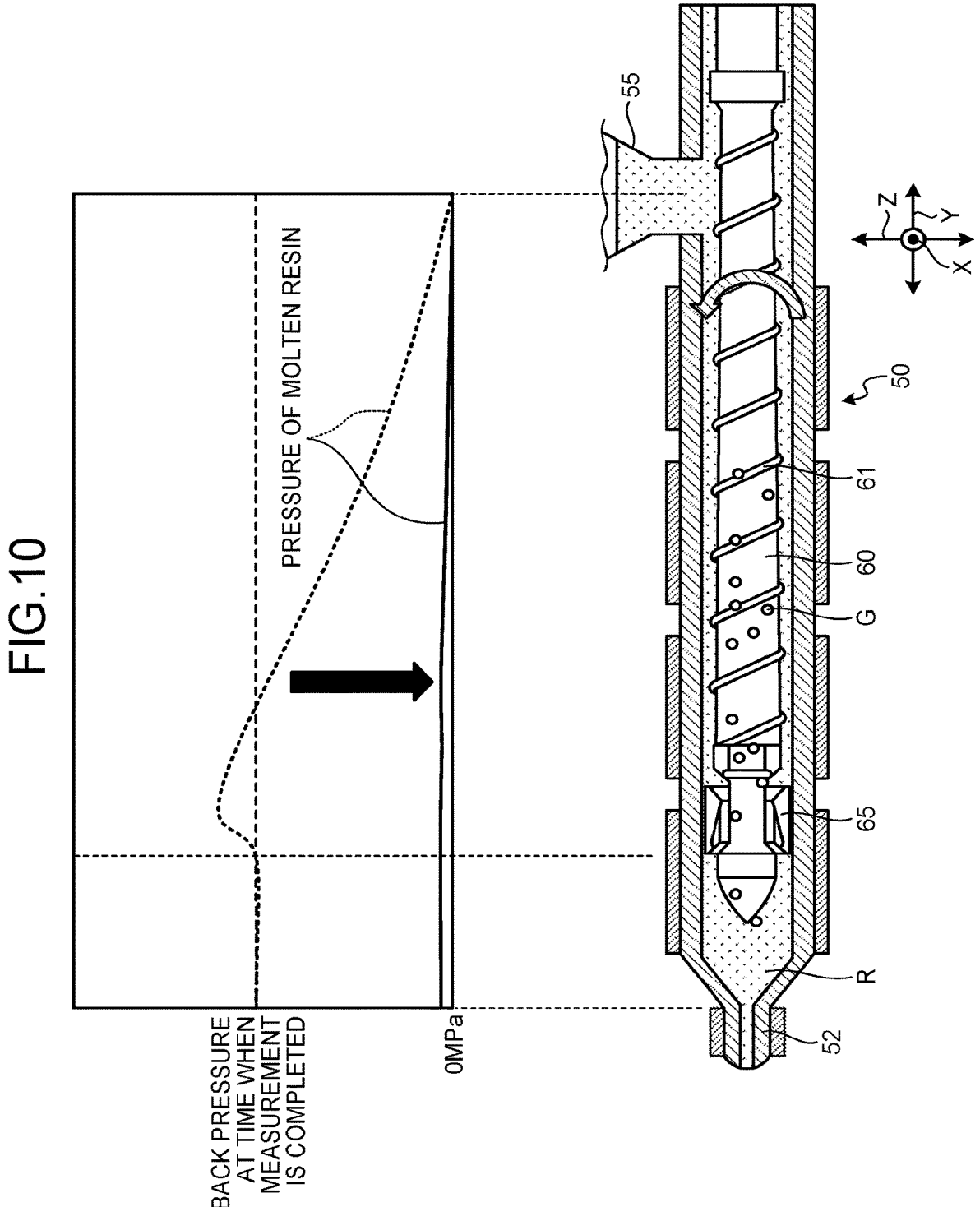
FIG. 10 is an explanatory diagram of a change in a pressure of molten resin inside the entire heating barrel at the time of reversely rotating a screw by a predetermined rotation angle for a short time.

FIG. 10 is an explanatory diagram of a change in the pressure of the molten resin R inside the entire heating barrel 50 at the time of reversely rotating the screw 60 by a predetermined rotation angle for a short time. FIG. 10 is an explanatory diagram of a change in the pressure of the molten resin R at the time of reversely rotating the screw 60 at once by a predetermined rotation angle while stopping movement of the screw 60 in the longitudinal direction Y. In a case of reversely rotating the screw 60 at once by a predetermined rotation angle after the measurement process is completed, as illustrated in FIG. 10, the pressure of the molten resin R is abruptly reduced to the vicinity of 0 MPa in the entire heating barrel 50. Due to this, the gas G tends to be generated from the entire molten resin R, and the gas G tends to be accumulated in the entire heating barrel 50.

In a case of reversely rotating the screw 60 at once by a predetermined rotation angle, a weighting time from when the measurement process is completed until the molten resin R injected into the mold is cooled to be solidified is increased, so that the gas G may be continuously generated even in the waiting time. Also in this case, a silver streak may be easily generated on the surface of the molded article due to the generated gas G.

On the other hand, in the present embodiment, after the measurement process is completed, control is performed so that the back pressure of the molten resin R becomes the target pressure when the target time comes. Due to this, it is possible to prevent the molten resin R from passing through the check ring 65 to move in the longitudinal direction Y after the measurement process is completed. Thus, it is possible to prevent the weight of the molten resin R measured on the distal end side in the heating barrel 50 from being changed, and prevent the weight of the molded article from being changed from the desired weight.

By performing control so that the back pressure of the molten resin R becomes the target pressure when the target time comes, it is possible to prevent the pressure of the molten resin R in the heating barrel 50 from being abruptly changed. Due to this, it is possible to prevent the gas G from being generated from the molten resin R due to the abrupt reduction of the pressure of the molten resin R. Accordingly, it is possible to prevent a silver streak from being generated on the surface of the molded article due to the gas G generated in the molten resin R.

By performing control so that the back pressure of the molten resin R becomes the target pressure when the target time comes, it is possible to prevent the molten resin R from leaking out from the nozzle part 52 due to a high back pressure when the molded article in the mold of the mold clamping device 15 is taken out. Due to this, it is possible to prevent the amount of the molten resin R used for the molded article from being changed because the molten resin R that is completely measured leaks out. As a result, quality of the molded article can be more securely improved.

The target pressure is 0 MPa, so that the back pressure of the molten resin R positioned on the distal end side of the heating barrel 50 can be made 0 MPa at the timing when cooling of the molded resin in the mold included in the mold clamping device 15 is completed. Due to this, the back pressure of the molten resin R can be more securely reduced at the time when cooling is completed in the mold included in the mold clamping device 15 while preventing the back pressure of the molten resin R from being abruptly reduced after the measurement process is completed. Accordingly, the back pressure of the molten resin R can be more securely reduced and the molten resin R can be prevented from leaking out from the nozzle part 52 while suppressing generation of the gas G due to abrupt reduction of the back pressure of the molten resin R. As a result, the quality of the molded article can be more securely improved.

The target time is a time when cooling of the molded resin is completed in the mold for molding the molten resin R molten in the heating barrel 50, so that reduction of the back pressure of the measured molten resin R can be completed at the timing when cooling of the molded resin is completed. Accordingly, the back pressure of the molten resin R can be more securely reduced at the time when cooling of the molded resin is completed, and the molten resin R can be prevented from leaking out from the nozzle part 52 while suppressing generation of the gas G due to abrupt reduction of the back pressure of the molten resin R. As a result, the quality of the molded article can be more securely improved.

Modification

Figure 11:
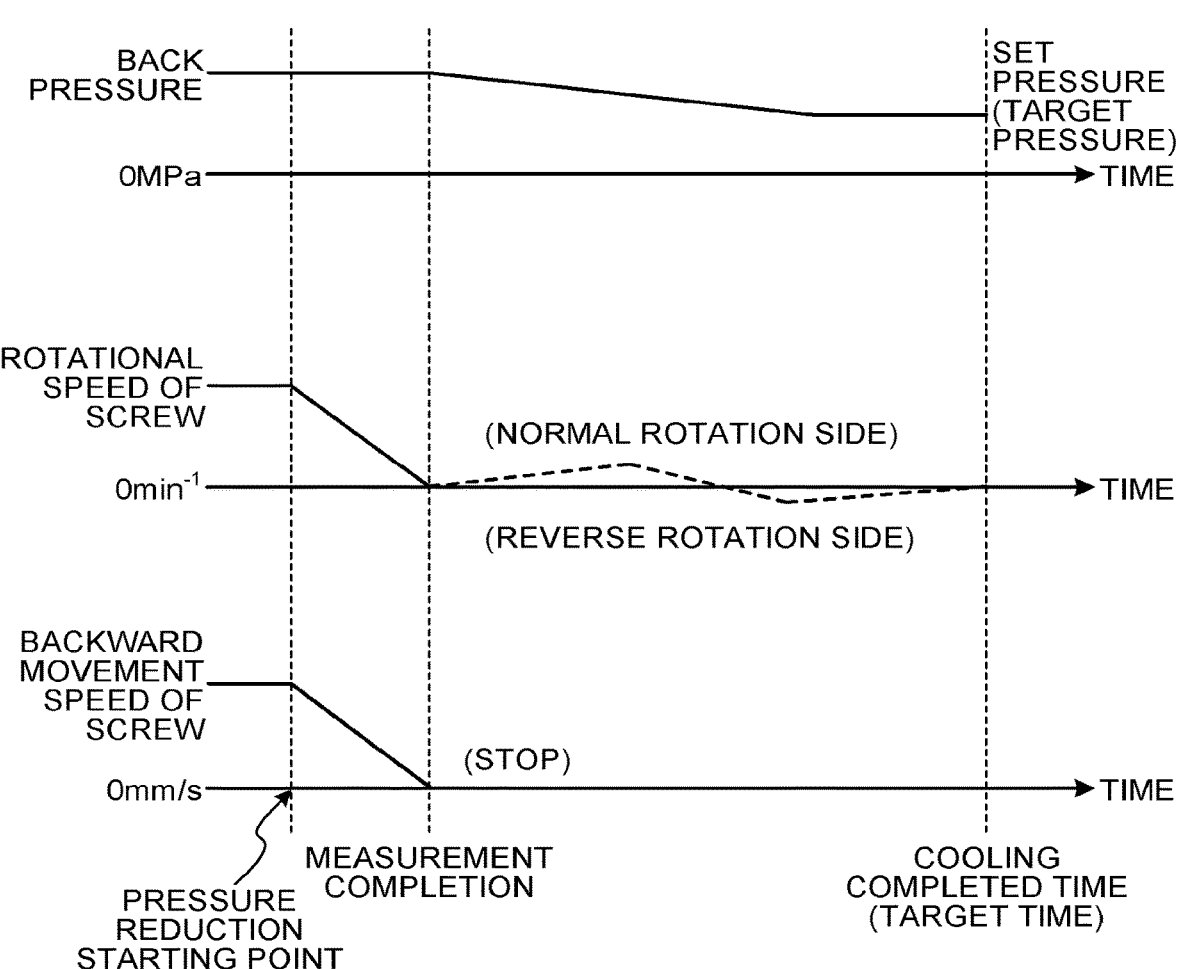
FIG. 11 is an explanatory diagram of a modification of a control method for the injection molding machine according to the embodiment in a case in which a target pressure is an optional set pressure.

The target pressure is 0 MPa in the embodiment described above, but the target pressure is not necessarily 0 MPa. FIG. 11 is an explanatory diagram of a modification of the control method for the injection molding machine 1 according to the embodiment in a case in which the target pressure is an optional set pressure. The target pressure at the time when the target time comes after the measurement process is completed may be set to be higher than 0 MPa as illustrated in FIG. 11, for example, and the target pressure may also be a set pressure that is set depending on the molten resin. For example, in a case in which the molten resin is foamed plastic used for foam molding, when the back pressure of the molten resin is excessively reduced before the molten resin is injected into the mold, gas included in the molded resin may be excessively foamed before molding. Thus, in such a case, the back pressure capable of suppressing foaming of the gas included in the molten resin may be set as the set pressure, and the set pressure may be used as the target pressure. Due to this, desired foam molding can be performed even in a case of using foamed plastic as the molten resin. As described above, the target pressure may be a set pressure that is set depending on the molten resin. As a result, the quality of the molded article can be more securely improved irrespective of a type of the molten resin.

Figure 12:
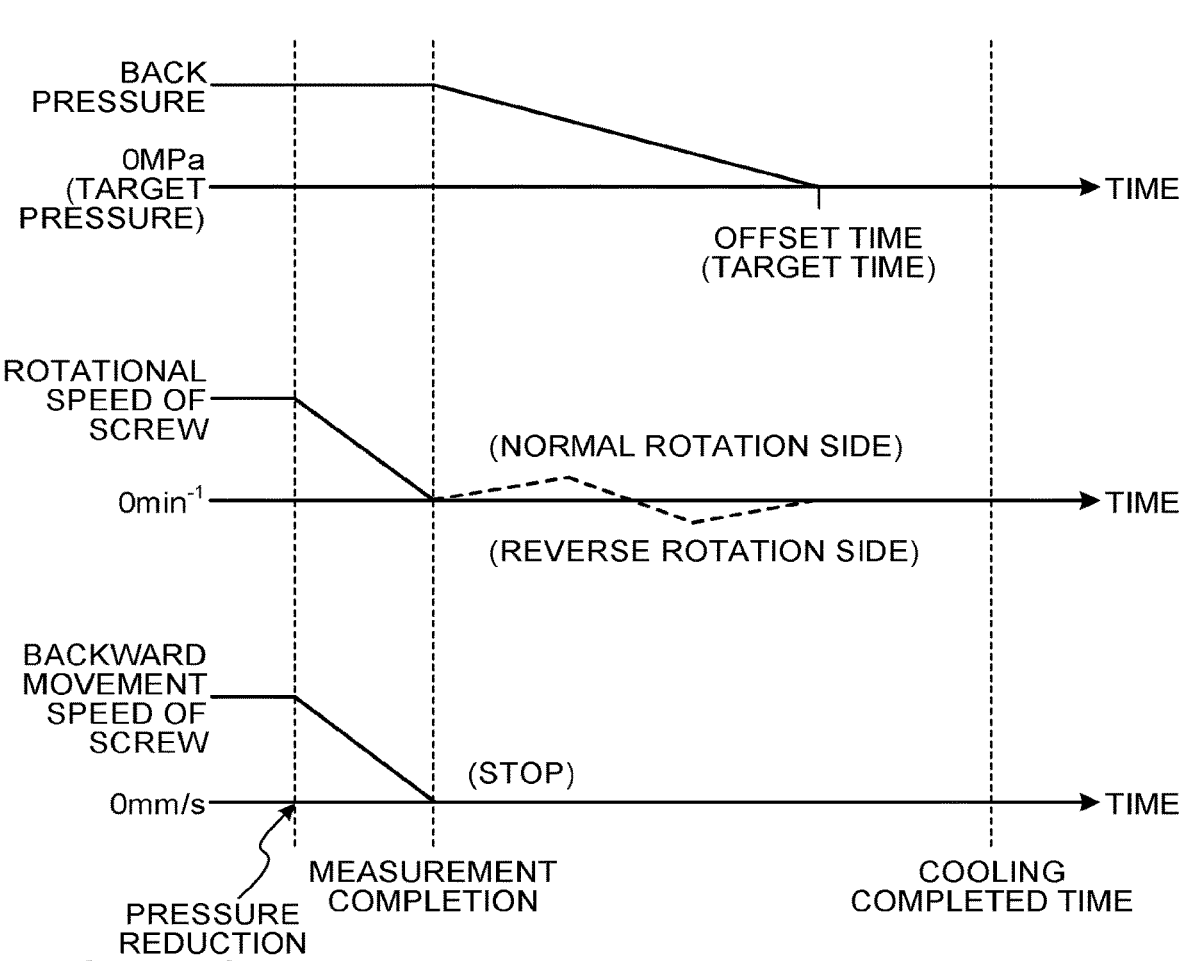
FIG. 12 is an explanatory diagram of a modification of the control method for the injection molding machine according to the embodiment in a case in which a target time is an optional offset time.

In the embodiment described above, the target time is the time when cooling of the molded resin is completed, but the target time is not necessarily the time when cooling of the molded resin is completed. FIG. 12 is an explanatory diagram of a modification of the control method for the injection molding machine 1 according to the embodiment in a case in which the target time is an optional offset time. The target time for reducing the pressure of the molten resin to the target pressure after the measurement process is completed may be a time earlier than the time when cooling of the molded resin is completed as illustrated in FIG. 12, for example. That is, the target time may be an offset time set to be earlier than the time when cooling of the molded resin is completed in the mold for molding the molten resin molten in the heating barrel 50. Due to this, delay of a change in the back pressure can be absorbed even in a case in which reduction of the actual back pressure of the molten resin proceeds slowly as compared with pressure reduction control for the back pressure of the molten resin by controlling the rotational speed and the rotation direction of the screw 60, and the actual back pressure of the molten resin can be more securely reduced to the target pressure at the time when cooling of the molded resin is completed. As a result, the quality of the molded article can be more securely improved.

What is claimed is:

1. A control method for an injection molding machine, the method comprising:
   a metering process of accumulating a quantity of molten resin to be used in an injection cycle, the metering process includes feeding the molten resin along a length of a heating barrel by moving a screw backward while rotating the screw in the heating barrel for melting a resin material;
   during the metering process and before the metering process is completed, decelerating a rotational speed of the screw at a same time as decelerating a backward movement speed of the screw in order to stop backward movement of the screw at completion of the metering process;
   measuring a back pressure of the molten resin, which is a pressure of the molten resin metered in the metering process;
   controlling the rotational speed and a rotation direction of the screw so that the back pressure becomes a target pressure lower than the back pressure that is measured at a time when the metering process is completed when a target time is reached; and
   injecting the molten resin into a mold after reaching the target time.

2. The control method for the injection molding machine according to claim 1, wherein the target pressure is 0 MPa.

3. The control method for the injection molding machine according to claim 1, wherein the target pressure is a set pressure that is set depending on the molten resin.

4. The control method for the injection molding machine according to claim 1, wherein the target time is a time when cooling of molded resin is completed in a mold for molding the molten resin molten in the heating barrel.

5. The control method for the injection molding machine according to claim 1, wherein the target time is an offset time that is set to be earlier than a time when cooling of molded resin is completed in a mold for molding the molten resin molten in the heating barrel.

6. An injection molding machine comprising:
   a heating barrel in which a resin material is heated and becomes molten resin;
   a screw that is disposed rotatably in the heating barrel, and movable in an axis direction of rotation in the heating barrel;
   a back pressure detection unit that detects a back pressure as a pressure of the molten resin ejected by the screw in the heating barrel; and
   a control unit that controls rotation of the screw and movement of the screw by moving the screw backward while rotating the screw to feed the molten resin along a length of the heating barrel and accumulate a quantity of molten resin to be used in an injection cycle, the control unit determines a back pressure of the accumulated quantity of molten resin based on the back pressure detected by the back pressure detection unit,
   wherein during a metering process before the metering process is completed, the control unit is configured to decelerate a rotational speed of the screw at a same time as a backward movement speed of the screw is decelerated,
   wherein the control unit is configured to stop backward movement of the screw at completion of the metering process,
   wherein the metering process is a process of accumulating a quantity of the molten resin to be used in an injection cycle,
   wherein the control unit is configured to control the rotational speed and a rotation direction of the screw so that the back pressure detected by the back pressure detection unit becomes a target pressure lower than the back pressure of when the metering process is completed when a target time is reached, and
   wherein the control unit is configured to control an injection of the accumulated molten resin into a mold after reaching the target time.

* * * * *